(12) United States Patent
Farmer, Jr.

(10) Patent No.: US 9,537,815 B2
(45) Date of Patent: Jan. 3, 2017

(54) EVENT GREETING SYSTEM AND METHOD

(71) Applicant: Google Inc., Mountain View, CA (US)

(72) Inventor: Richard Allen Farmer, Jr., San Francisco, CA (US)

(73) Assignee: Google Inc., Mountain View ( * ) Notice: Subject to any disclaimer, the term of this patent is extended or adjusted under 35 U.S.C. 154(b) by 243 days.

(21) Appl. No.: 13/887,835

(22) Filed: May 6, 2013

(65) Prior Publication Data
US 2014/0330903 A1    Nov. 6, 2014

(51) Int. Cl.
*H04L 12/58* (2006.01)

(52) U.S. Cl.
CPC .............. *H04L 51/32* (2013.01); *H04L 51/24* (2013.01)

(58) Field of Classification Search
CPC .......... H04L 51/32; H04L 29/06; G06Q 10/10
USPC ......................................... 709/204
See application file for complete search history.

(56) References Cited

U.S. PATENT DOCUMENTS

| | | | |
|---|---|---|---|
| 7,669,123 B2 * | 2/2010 | Zuckerberg et al. | 715/273 |
| 8,965,988 B1 * | 2/2015 | Negahban | H04W 4/22 455/404.2 |
| 2002/0138582 A1 * | 9/2002 | Chandra et al. | 709/206 |
| 2010/0081461 A1 | 4/2010 | Bothra et al. | |
| 2011/0153504 A1 | 6/2011 | Rojas et al. | |
| 2012/0060105 A1 * | 3/2012 | Brown et al. | 715/753 |
| 2012/0079023 A1 * | 3/2012 | Tejada-Gamero et al. | 709/204 |
| 2012/0323928 A1 * | 12/2012 | Bhatia | 707/748 |
| 2013/0042169 A1 * | 2/2013 | Reedy | 715/202 |
| 2013/0066963 A1 | 3/2013 | Odio et al. | |
| 2013/0130780 A1 * | 5/2013 | Allen et al. | 463/25 |
| 2013/0159115 A1 * | 6/2013 | Adams | G06Q 50/01 705/14.66 |
| 2013/0227432 A1 * | 8/2013 | Lin | H04L 41/22 715/753 |
| 2013/0332308 A1 * | 12/2013 | Linden | G06Q 30/0631 705/26.7 |
| 2014/0136993 A1 * | 5/2014 | Luu | H04L 51/32 715/753 |
| 2014/0229552 A1 * | 8/2014 | Ranganath et al. | 709/206 |

FOREIGN PATENT DOCUMENTS

KR    2011-000689    1/2011

OTHER PUBLICATIONS

Drew Olanoff, "Facebook makes it even easier to wish someone a Happy Birthday", retrieved from a web blog, Sep. 2011.*
International Search Report and Written Opinion for PCT Application PCT/US2014/037030, dated Jan. 15, 2015, 9 pages.

* cited by examiner

*Primary Examiner* — Nicholas Taylor
*Assistant Examiner* — Chong G Kim
(74) *Attorney, Agent, or Firm* — Patent Law Works LLP (57) ABSTRACT

A method, computer program product, and computing system for providing a event notification concerning a specific member of a social network to one or more social network friends of the specific member. A first event message is received in response to the event notification from a first social network friend of the specific member. In response to the first event message, a communal space within the social network accessible by the specific member and the one or more social network friends is generated. The first event message from the first social network friend is posted within the communal space.

21 Claims, 7 Drawing Sheets

EVENT GREETING SYSTEM AND METHOD

TECHNICAL FIELD

This disclosure relates to social networks and, more particularly, to event greetings within social networks.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

As is known in the art, the phrase social network may be used to refer to a group of technologies (e.g. Web-based and mobile technologies) that may allow for users to engage in a quasi-real-time, interactive dialogue. Social networking websites have allowed people to interact and socialize in ways that were unimaginable ten years ago. For example, the use of such social networking websites has allowed for long lost friends to be reunited, long-distance friendships to be easily maintained, and information to be broadcast to groups of people.

SUMMARY OF DISCLOSURE

In one implementation, a computer-implemented method includes providing an event notification concerning a specific member of a social network to one or more social network friends of the specific member. A first event message is received in response to the event notification from a first social network friend of the specific member. In response to the first event message, a communal space within the social network accessible by the specific member and the one or more social network friends is generated. The first event message from the first social network friend is posted within the communal space.

One or more of the following features maybe included. A second event message may be received in response to the event notification from a second social network friend of the specific member. The second event message from the second social network friend may be posted within the communal space.

The communal space may be deactivated upon the expiry of a defined period of time after the event of the specific member. Deactivating the communal space may include deleting the communal space upon the expiry of the defined period of time after the event of the specific member. Deactivating the communal space may include locking the communal space upon the expiry of the defined period of time after the event of the specific member. The communal space may be a forum within the social network. The social network may be an SMS-based social network.

In another implementation, a computer program product resides on a computer readable medium and has a plurality of instructions stored on it. When executed by a processor, the instructions cause the processor to perform operations including providing an event notification concerning a specific member of a social network to one or more social network friends of the specific member. A first event message is received in response to the event notification from a first social network friend of the specific member. In response to the first event message, a communal space within the social network accessible by the specific member and the one or more social network friends is generated. The first event message from the first social network friend is posted within the communal space.

One or more of the following features maybe included. A second event message may be received in response to the event notification from a second social network friend of the specific member. The second event message from the second social network friend may be posted within the communal space.

The communal space may be deactivated upon the expiry of a defined period of time after the event of the specific member. Deactivating the communal space may include deleting the communal space upon the expiry of the defined period of time after the event of the specific member. Deactivating the communal space may include locking the communal space upon the expiry of the defined period of time after the event of the specific member. The communal space may be a forum within the social network. The social network may be an SMS-based social network.

In another implementation, a computing system including a processor and memory is configured to perform operations including providing an event notification concerning a specific member of a social network to one or more social network friends of the specific member. A first event message is received in response to the event notification from a first social network friend of the specific member. In response to the first event message, a communal space within the social network accessible by the specific member and the one or more social network friends is generated. The first event message from the first social network friend is posted within the communal space.

One or more of the following features maybe included. A second event message may be received in response to the event notification from a second social network friend of the specific member. The second event message from the second social network friend may be posted within the communal space.

The communal space may be deactivated upon the expiry of a defined period of time after the event of the specific member. Deactivating the communal space may include deleting the communal space upon the expiry of the defined period of time after the event of the specific member. Deactivating the communal space may include locking the communal space upon the expiry of the defined period of time after the event of the specific member. The communal space may be a forum within the social network. The social network may be an SMS-based social network.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Introduction

Figure 1:
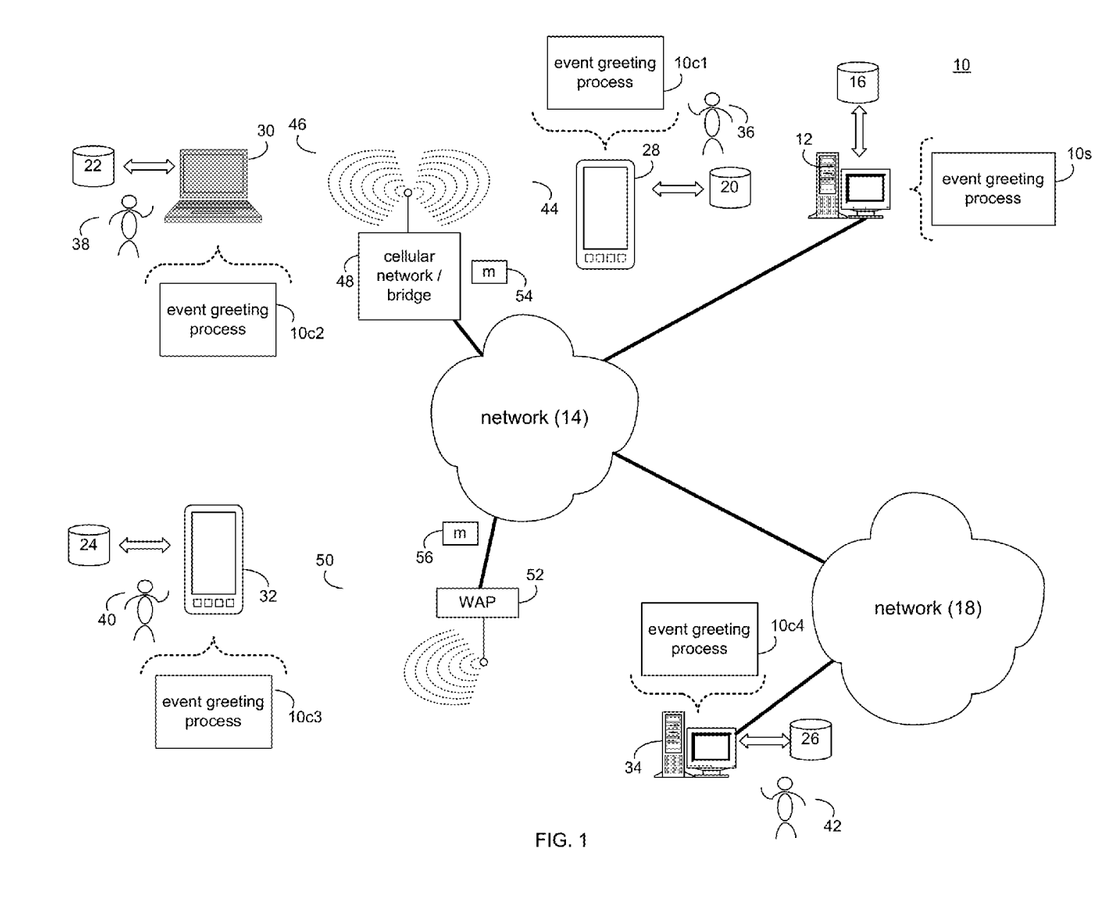
FIG. 1 is a diagrammatic view of a distributed computing network including a computing device that executes an event greeting process according to an implementation of the present disclosure.
Figure 2:
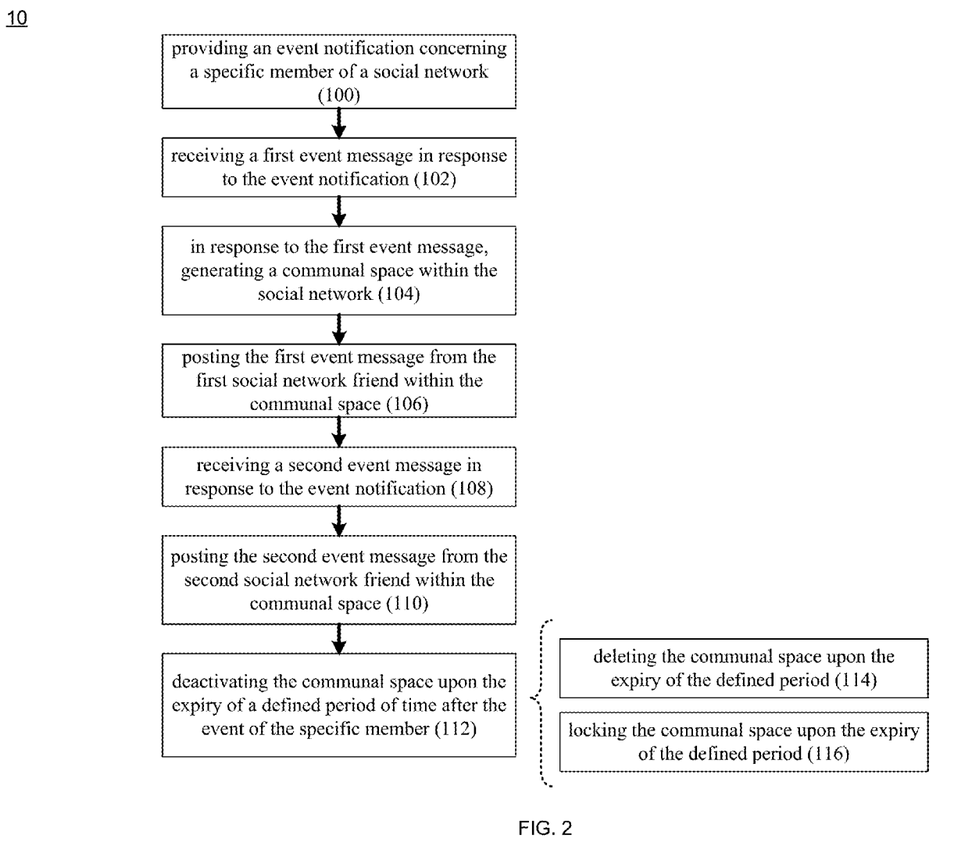
FIG. 2 is a flowchart of the event greeting process of FIG. 1 according to an implementation of the present disclosure.

In FIGS. 1 & 2, there is shown event greeting process 10. Event greeting process 10 may be implemented as a server-side process, a client-side process, or a hybrid server-side/client-side process. For example, event greeting process 10 may be implemented as a purely server-side process via event greeting process 10s. Alternatively, event greeting process 10 may be implemented as a purely client-side process via one or more of event greeting process 10c1, event greeting process 10c2, event greeting process 10c3, and event greeting process 10c4. Alternatively still, event greeting process 10 may be implemented as a hybrid server-side/client-side process via event greeting process 10s in combination with one or more of event greeting process 10c1, event greeting process 10c2, event greeting process 10c3, and event greeting process 10c4. Accordingly, event greeting process 10 as used in this disclosure may include any combination of event greeting process 10s, event greeting process 10c1, event greeting process 10c2, event greeting process 10c3, and event greeting process 10c4.

As will be discussed below in greater detail, event greeting process 10 may provide 100 an event notification concerning a specific member of a social network to one or more social network friends of the specific member. A first event message may be received 102 in response to the event notification from a first social network friend of the specific member. In response to the first event message, a communal space within the social network accessible by the specific member and the one or more social network friends may be generated 104. The first event message from the first social network friend may be posted 106 within the communal space.

Event greeting process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of event greeting process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of event greeting processes 10c1, 10c2, 10c3, 10c4 may include but are not limited to a web browser, a web browser plug-in or applet, a game console user interface, a video conference user interface, or a specialized application (e.g., an application running on e.g., the Android™ platform or the iOS™ platform). The instruction sets and subroutines of event greeting processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Event Greeting Process

Figure 3:
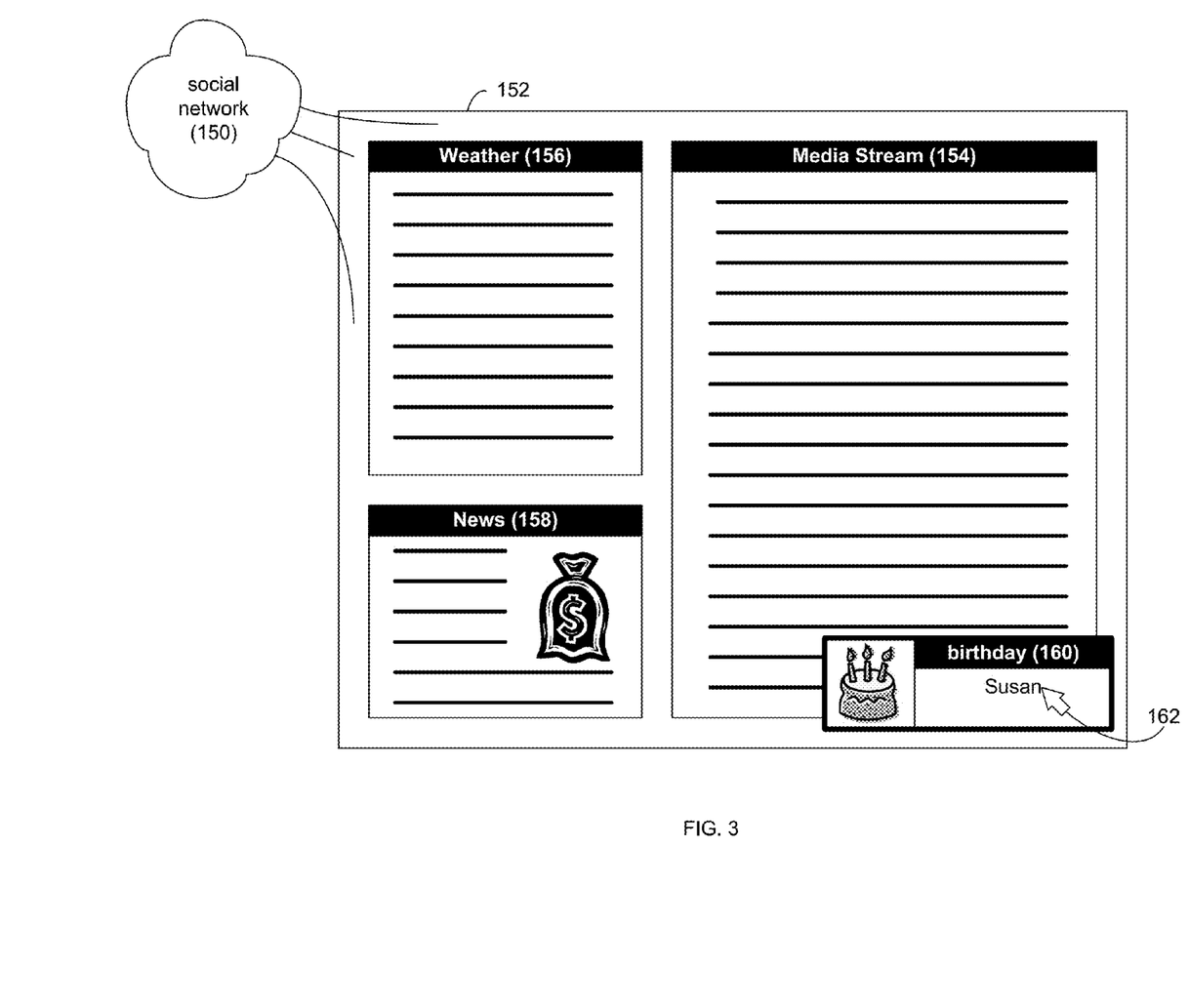
FIG. 3 is a diagrammatic view of a graphical user interface rendered by the event greeting process of FIG. 1 according to an implementation of the present disclosure.

Referring also to FIG. 3, event greeting process 10 may be included within, executed within, or a portion of a social network (e.g., social network 150). As discussed above, the phrase social network may be used to refer to a group of technologies (e.g. web-based and mobile technologies) that allow for users to engage in a quasi-real-time, interactive dialogue. Examples of social network 150 may include more traditional social networks or SMS-based social network. Social network 150 may include graphical user interface 152, which may be divided into a plurality of sections, such as media stream 154 (which may display a media stream for review by the user), weather 156 (which may display the local weather of the user) and news 158 (which may display news that is of interest to the user).

For the following discussion, event greeting process 10 is going to be described as providing greetings concerning birthdays. However, this is for illustrative purposes only and is not intended to be a limitation of this disclosure, as other configurations are possible and are considered to be within the scope of this disclosure. For example, event greeting process 10 may be configured to provide greetings concerning anniversaries, celebrations, or holidays.

Social network 150 may be configured to allow users to provide information concerning various events (e.g., birthdays and anniversaries). For example, when a user establishes an account on social network 150, that user may define their birthday, thus enabling for the generation of birthday notifications within social network 150.

Event greeting process 10 may be configured to provide 100 a event notification (e.g. event notification 160) concerning a specific member of social network 150 to one or more social network friends of the specific member. Event greeting process 10 may be configured so that event notifications are provided to the friends of the user proximate the user's birthday (e.g., within a defined period of time). Additionally, such event notifications may only be provided to members of social network 150 who are friends (via groups or circles) with user 38. Accordingly, assuming that user 42 does not know user 38, event greeting process 10 will not provide 100 event greeting 160 to user 42.

Assume for illustrative purposes that user 36 is named Mark, user 38 is named Susan, user 40 is named John, and user 42 is named Cindy. Further assume that user 36 is a member of social network 150 and graphical user interface 152 is rendered for user 36 upon logging into social network 150. Additionally, assume that when user 38 (i.e. Susan) established an account with social network 150, user 38 provided social network 150 with information concerning her birthday. And finally, assume that when user 36 logs into social network 150, they do so five days before Susan's birthday, which is within the above-described defined period of time (e.g. seven days). Accordingly, upon user 36 logging into social network 150, event greeting process 10 may provide 100 event notification 160 to user 36, thus informing user 36 that the birthday of user 38 is approaching.

User 36 may review event notification 160 and, if user wishes to provide a birthday message to user 38 (i.e., Susan), user 36 may select event notification 160 using on-screen pointer 162 (which may be controllable via a mouse, not shown), thus initiating the event message generation process.

Figure 4:
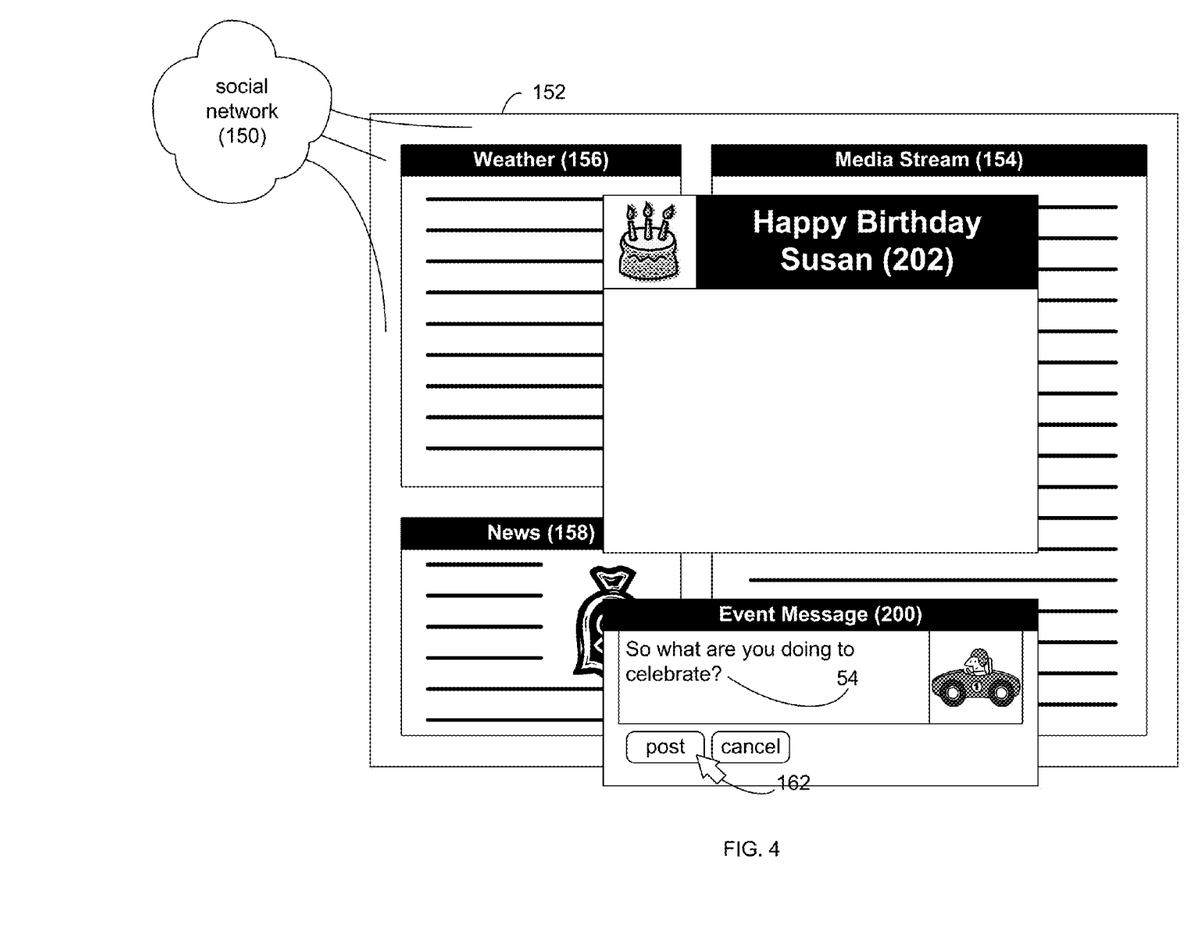
FIG. 4 is another diagrammatic view of a graphical user interface rendered by the event greeting process of FIG. 1 according to an implementation of the present disclosure.

Referring also to FIG. 4, upon user 36 selecting event notification 160, user 36 may be directed to event message generation window 200, which may be configured to allow user 36 to compose a birthday message for user 38. Accordingly, user 36 may compose their birthday message (e.g., "So what are you doing to celebrate?") and select (via onscreen pointer 162) the "post" button, resulting in the generation of first event message 54, which may be received 102 by event greeting process 10. For this example, assume that user 36 is the first person to provide a birthday message (e.g., first event message 54) to user 38 (i.e. Susan).

In response to receiving 102 first event message 54, event greeting process 10 may generate 104 communal space 202 within social network 150. Communal space 202 may be configured to allow for the posting of e.g., first event message 54. Further, communal space 202 may be configured to be accessible by user 38 and any social network friends of user 38 who received event notification 160. An example of communal space 202 may include but is not limited to a quasi-public forum within social network 150.

Once communal space 202 is generated 104, event greeting process 10 may post 106 first event message 54 from user 36 within communal space 202 for review by user 38. Further, assume that event greeting process 10 provides 100 event notification 160 to other members (e.g., user 40) of social network 150. Additionally, assuming that upon reviewing event notification 160, user 40 (i.e., John) wishes to provide a birthday message to user 38 (i.e., Susan), user 40 may select event notification 160 using on-screen pointer 162 in the manner described above.

Figure 5:
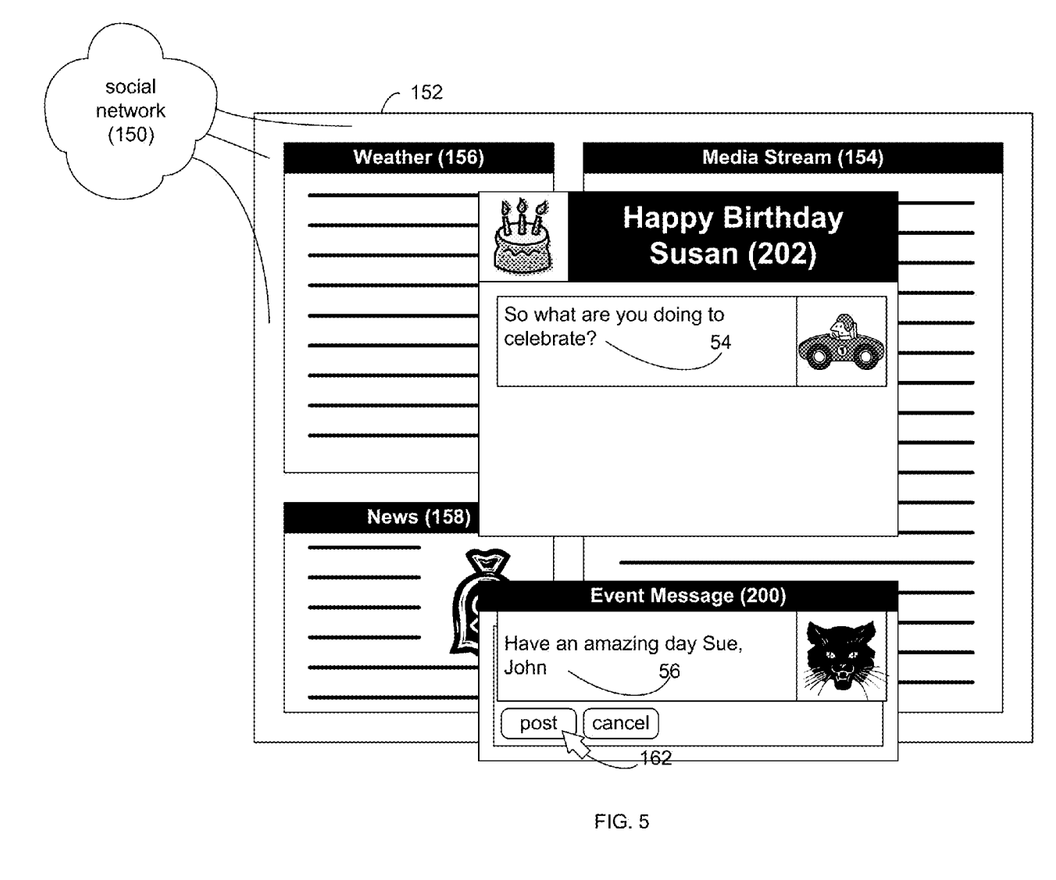
FIG. 5 is another diagrammatic view of a graphical user interface rendered by the event greeting process of FIG. 1 according to an implementation of the present disclosure.

Referring also to FIG. 5, upon user 40 selecting event notification 160, user 40 may also be directed to event message generation window 200, which may be configured to allow user 40 to compose a birthday message for user 38. Accordingly, user 40 may compose their birthday message (e.g., "Have an amazing day Sue, John") and select (via onscreen pointer 162) the "post" button, resulting in the generation of second event message 56, which may be received 108 by event greeting process 10.

Since user 40 is not the first person to provide a birthday message to user 38 (i.e. user 36 had previously done so), communal space 202 has already been generated. Accordingly, upon receiving 108 second event message 56, event greeting process 10 may post 110 second event message 56 from user 40 within communal space 202 for review by user 38.

Figure 6:
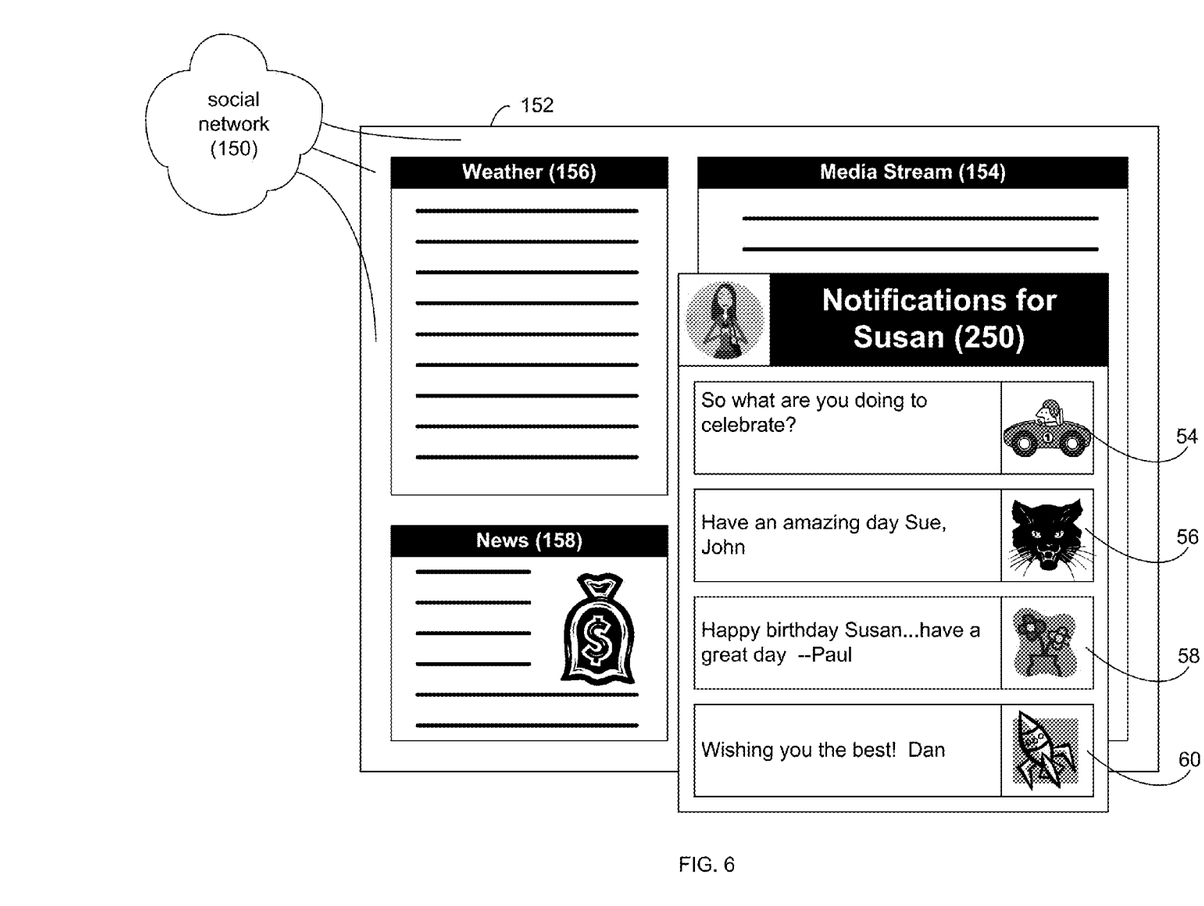
FIG. 6 is another diagrammatic view of a graphical user interface rendered by the event greeting process of FIG. 1 according to an implementation of the present disclosure.
Figure 7:
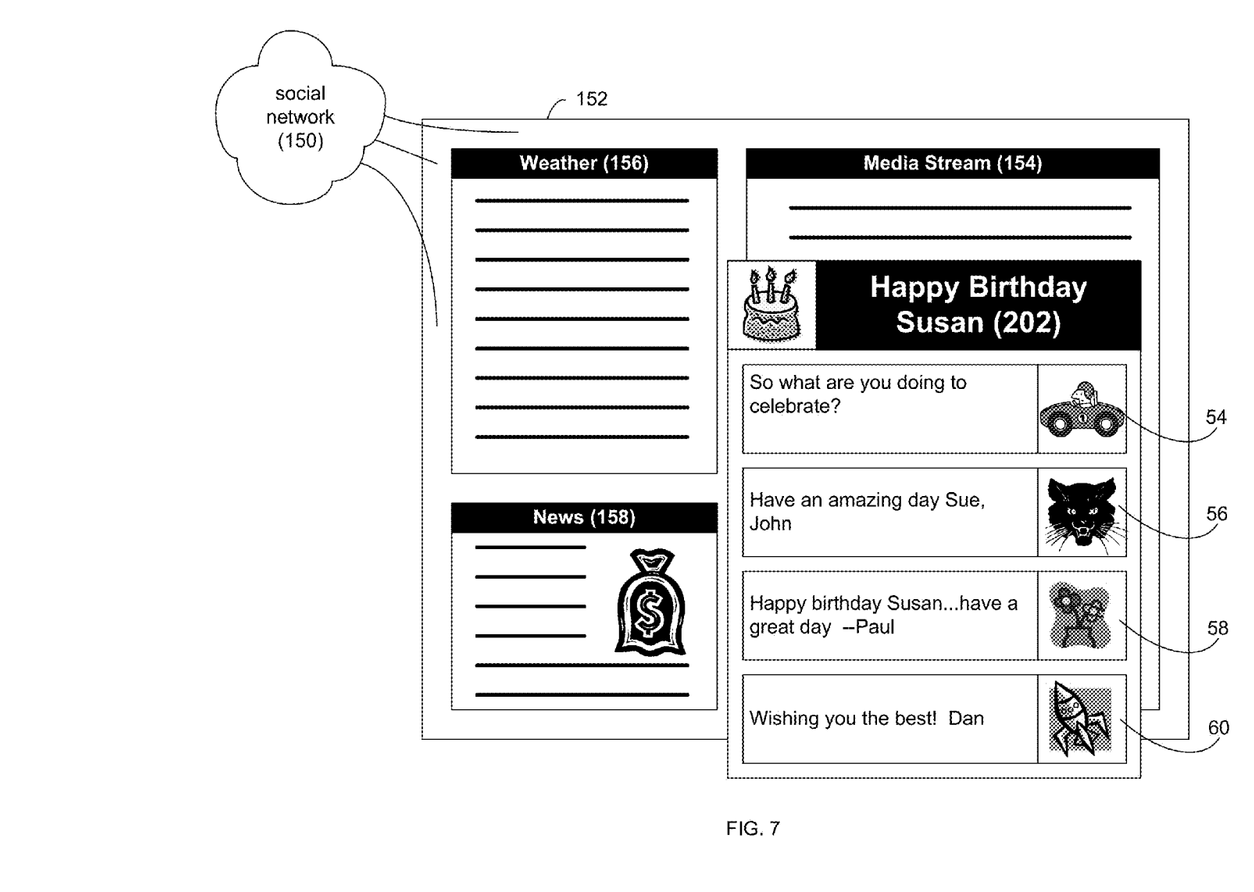
FIG. 7 is another diagrammatic view of a graphical user interface rendered by the event greeting process of FIG. 1 according to an implementation of the present disclosure.

Referring also to FIG. 6, upon logging into social network 150, event greeting process 10 may provide user 38 with notifications window 250 that may itemize notifications that were received by (in the example) user 38 (i.e., Susan). As all of the notifications within notifications window 250 concern the birthday of user 38 (namely event messages 54. 56. 58. 60), if user 38 selects any of these notifications, user 38 may be taken to communal space 202 (as shown in FIG. 7) so that user 38 may review their birthday messages (e.g., event messages 54, 56, 58, 60).

Event greeting process 10 may be configured to deactivate 112 communal space 202 upon the expiry of a defined period of time after the event of (in this example) user 38. For example and when deactivating 112 communal space 202, event greeting process 10 may delete 114 communal space 202 upon the expiry of the defined period of time after the birthday of user 38. For example, one week after the birthday of user 38, event greeting process 10 may delete 114 communal space 202.

Alternatively and when deactivating 112 communal space 202, event greeting process 10 may lock 116 communal space 202 upon the expiry of the defined period of time after the birthday of user 38. For example, one week after the birthday of user 38, event greeting process 10 may lock 116 communal space 202, thus preventing any other members from posting to communal space 202 while maintaining the same in an archive fashion.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
providing an event notification window, the event notification window including an event notification associated with a specific member of a social network to one or more social network friends of the specific member;
receiving a first event message input into an event message generation window in response to the event notification from a first social network friend of the specific member;
in response to receiving the first event message input into the event message generation window, generating a communal space viewable within the event notification window, the event notification window being separate from the event message generation window, the communal space accessible by the specific member and the one or more social network friends who received the event notification, the communal space configured to receive additional messages from the one or more social network friends who received the event notification;
posting the first event message from the first social network friend within the communal space;
providing the communal space for display to the specific member of the social network and the one or more social network friends of the specific member, the communal space including the first event message; and
preventing additional messages from being posted within the communal space by other members of the social network after an expiry of a defined period of time after an event represented by the event notification.

2. A computer-implemented method of claim 1 further comprising:
receiving a second event message in response to the event notification from a second social network friend of the specific member; and
posting the second event message from the second social network friend within the communal space.

3. A computer-implemented method of claim 1 further comprising:
deactivating the communal space upon the expiry of a defined period of time after the event of the specific member.

4. A computer-implemented method of claim 3 wherein deactivating the communal space includes:
deleting the communal space upon the expiry of the defined period of time after the event of the specific member.

5. A computer-implemented method of claim 3 wherein deactivating the communal space includes:
locking the communal space upon the expiry of the defined period of time after the event of the specific member.

6. A computer-implemented method of claim 1 wherein the communal space is a forum within the social network.

7. A computer-implemented method of claim 1 wherein the social network is an SMS-based social network.

8. A computer program product residing on a non-transitory computer readable medium having a plurality of instructions stored thereon which, when executed by a processor, cause the processor to perform operations comprising:
providing an event notification window, the event notification window including an event notification associated with a specific member of a social network to one or more social network friends of the specific member;
receiving a first event message input into an event message generation window in response to the event-notification from a first social network friend of the specific member;
in response to receiving the first event message input into the event message generation window, generating a communal space viewable within the event notification window, the event notification window being separate from the event message generation window, the communal space accessible by the specific member and the one or more social network friends who received the event notification, the communal space configured to receive additional messages from the one or more social network friends who received the event notification;
posting the first event message from the first social network friend within the communal space;
providing the communal space for display to the specific member of the social network and the one or more social network friends of the specific member, the communal space including the first event message; and
preventing additional messages from being posted within the communal space by other members of the social network after an expiry of a defined period of time after an event represented by the event notification.

9. A computer program product of claim 8 further comprising:
receiving a second event message in response to the event notification from a second social network friend of the specific member; and
posting the second event message from the second social network friend within the communal space.

10. A computer program product of claim 8 further comprising:
deactivating the communal space upon the expiry of a defined period of time after the event of the specific member.

11. A computer program product of claim 10 wherein deactivating the communal space includes:
deleting the communal space upon the expiry of the defined period of time after the event of the specific member.

12. A computer program product of claim 10 wherein deactivating the communal space includes:
locking the communal space upon the expiry of the defined period of time after the event of the specific member.

13. A computer program product of claim 8 wherein the communal space is a forum within the social network.

14. A computer program product of claim 8 wherein the social network is an SMS-based social network.

15. A computing system including a processor and memory configured to perform operations comprising:

providing an event notification window, the event notification window including an event notification associated with a specific member of a social network to one or more social network friends of the specific member;

receiving a first event message input into an event message generation window in response to the event notification from a first social network friend of the specific member;

in response to receiving the first event message input into the event message generation window, generating a communal space viewable within the event notification window, the event notification window being separate from the event message generation window, the communal space accessible by the specific member and the one or more social network friends who received the event notification, the communal space configured to receive additional messages from the one or more social network friends who received the event notification;

posting the first event message from the first social network friend within the communal space;

providing the communal space for display to the specific member of the social network and the one or more social network friends of the specific member, the communal space including the first event message; and preventing additional messages from being posted within the communal space by other members of the social network after an expiry of a defined period of time after an event represented by the event notification.

16. A computing system of claim 15 further comprising:

receiving a second event message in response to the event notification from a second social network friend of the specific member; and posting the second event message from the second social network friend within the communal space.

17. A computing system of claim 15 further comprising:

deactivating the communal space upon the expiry of a defined period of time after the event of the specific member.

18. A computing system of claim 17 wherein deactivating the communal space includes:

deleting the communal space upon the expiry of the defined period of time after the event of the specific member.

19. A computing system of claim 17 wherein deactivating the communal space includes:

locking the communal space upon the expiry of the defined period of time after the event of the specific member.

20. A computing system of claim 15 wherein the communal space is a forum within the social network.

21. A computing system of claim 15 wherein the social network is an SMS-based social network.

* * * * *

UNITED STATES PATENT AND TRADEMARK OFFICE
CERTIFICATE OF CORRECTION

PATENT NO. : 9,537,815 B2
APPLICATION NO. : 13/887835
DATED : January 3, 2017
INVENTOR(S) : Richard Allen Farmer, Jr.

It is certified that error appears in the above-identified patent and that said Letters Patent is hereby corrected as shown below:

On the Title Page

In item (57), the second Line, please replace "a event" with --an event--

In the Specification

In Column 5, Line 31, please replace "a" with --an--

Signed and Sealed this
Twenty-eighth Day of February, 2017

Michelle K. Lee
*Director of the United States Patent and Trademark Office*